(12) United States Patent
Malone et al.

(10) Patent No.: US 9,327,710 B2
(45) Date of Patent: May 3, 2016

(54) METHODS AND SYSTEMS FOR OPERATING A STOP/START ENGINE

(71) Applicant: Ford Global Technologies, LLC, Dearborn, MI (US)

(72) Inventors: Mark Douglas Malone, Canton, MI (US); Michael John Mould, Leverkusen (DE); William Najib Mansur, West Bloomfield, MI (US); Chad Everette Griffin, Pinckney, MI (US); Karl-Peter Hesseler, Lohmar-Donrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 14/025,725

(22) Filed: Sep. 12, 2013

(65) Prior Publication Data
US 2015/0073675 A1 Mar. 12, 2015

(51) Int. Cl.
*B60W 10/188* (2012.01)
*B60W 10/06* (2006.01)
*B60W 10/184* (2012.01)
*B60W 30/18* (2012.01)
*G06F 7/70* (2006.01)

(52) U.S. Cl.
CPC ............ *B60W 10/188* (2013.01); *B60W 10/06* (2013.01); *B60W 10/184* (2013.01); *B60W 30/18018* (2013.01); *B60W 2510/182* (2013.01); *B60W 2520/04* (2013.01); *B60W 2540/10* (2013.01); *B60W 2540/12* (2013.01); *Y10T 477/814* (2015.01)

(58) Field of Classification Search
CPC .............. Y10T 477/75; Y10T 477/813; Y10T 477/814
See application file for complete search history.

(56) References Cited

U.S. PATENT DOCUMENTS

| | | | | |
|---|---|---|---|---|
| 6,024,424 A * | 2/2000 | Nakazawa et al. | ......... | 303/116.1 |
| 6,089,677 A * | 7/2000 | Fukumura et al. | ............ | 303/112 |
| 6,278,916 B1 * | 8/2001 | Crombez | ......................... | 701/22 |
| 6,307,277 B1 * | 10/2001 | Tamai et al. | ................. | 290/40 C |
| 7,000,998 B2 * | 2/2006 | Hano et al. | ..................... | 303/191 |
| 7,166,060 B2 * | 1/2007 | Jlang et al. | ..................... | 477/172 |
| 7,480,545 B2 * | 1/2009 | Braeuer et al. | ..................... | 701/1 |
| 7,890,243 B2 | 2/2011 | Abendroth | | |
| 7,926,888 B2 * | 4/2011 | Reuter et al. | ................... | 303/151 |
| 2001/0028194 A1 * | 10/2001 | Isono et al. | .................... | 303/122 |
| 2002/0116113 A1 * | 8/2002 | Kaneko | .......................... | 701/112 |
| 2002/0130549 A1 * | 9/2002 | Harris et al. | .................... | 303/11 |
| 2003/0155807 A1 * | 8/2003 | Tabor | ............................... | 303/15 |
| 2004/0226768 A1 * | 11/2004 | DeLuca et al. | ................ | 180/275 |
| 2005/0001481 A1 * | 1/2005 | Kley et al. | ...................... | 303/191 |
| 2006/0111823 A1 * | 5/2006 | Tamai | ............................... | 701/38 |
| 2007/0006831 A1 * | 1/2007 | Leone et al. | ................ | 123/90.15 |
| 2007/0050120 A1 * | 3/2007 | Tabata et al. | .................... | 701/80 |
| 2008/0086253 A1 * | 4/2008 | Nakayama | ....................... | 701/80 |
| 2008/0284240 A1 * | 11/2008 | Jeong | ................................ | 303/11 |
| 2009/0319161 A1 * | 12/2009 | Abendroth | ...................... | 701/112 |
| 2010/0312460 A1 * | 12/2010 | Yamaguchi | ................... | 701/112 |

(Continued)

*Primary Examiner* — Redhwan k Mawari
(74) *Attorney, Agent, or Firm* — David Kelley; Alleman Hall McCoy Russell & Tuttle LLP (57) ABSTRACT

Systems and methods for improving operation of a vehicle are presented. In one example, vehicle brakes are held to reduce the possibility of vehicle motion and stopping of engine rotation is prevented until confirmation of vehicle hold is present. The approach may allow an engine to remain in an off state for a longer period of time while reducing the possibility of vehicle motion.

17 Claims, 6 Drawing Sheets

(56) References Cited

U.S. PATENT DOCUMENTS

| | | | |
|---|---|---|---|
| 2011/0001351 A1* | 1/2011 | Grell et al. | 303/11 |
| 2011/0136625 A1* | 6/2011 | Yu et al. | 477/185 |
| 2011/0137543 A1* | 6/2011 | Gibson et al. | 701/113 |
| 2011/0276245 A1* | 11/2011 | Krueger et al. | 701/71 |
| 2013/0024058 A1* | 1/2013 | Han | 701/22 |
| 2013/0090800 A1* | 4/2013 | Nakamura et al. | 701/22 |
| 2015/0073675 A1* | 3/2015 | Malone et al. | 701/70 |

* cited by examiner

METHODS AND SYSTEMS FOR OPERATING A STOP/START ENGINE

FIELD

The present description relates to a system and methods for improving vehicle drivability and fuel economy. The methods may be particularly useful for engines that are frequently stopped and restarted to conserve fuel.

BACKGROUND AND SUMMARY

An engine may be automatically stopped without a driver providing input to a device that has a sole purpose or function of stopping engine rotation so that fuel may be conserved. By stopping the engine, fuel consumption may be reduced at a time where engine efficiency may be less than is desired. One way to judge whether or not to stop an engine is to allow the engine to stop if the driver is applying a brake pedal and while vehicle speed is zero. If both conditions are met for a sufficient period of time, engine rotation may be stopped. However, if the driver temporarily releases or partially releases the brake pedal, the engine may be restarted so that the vehicle may launch. If the driver inadvertently releases the brake pedal, fuel conservation may not be realized and the driver may become aggravated. Additionally, if the vehicle is parked on an incline, the vehicle may move when the driver has no actual intent to do so.

The inventors herein have recognized the above-mentioned disadvantages and have developed a method for operating an engine, comprising: combusting an air-fuel mixture in an engine; stopping vehicle motion in response to a driver applying a brake pedal; applying vehicle brakes in response to the driver at least partially releasing the brake pedal; and stopping engine rotation in response to an indication applied braking force is sufficient to hold the vehicle from moving.

By applying vehicle brakes in response to a driver at least partially releasing a brake pedal and stopping engine rotation in response to an indication that applied braking force is sufficient to hold the vehicle from moving, the technical result that the engine may be turned off and may remain in a stopped state while the driver releases or partially releases a brake pedal may be achieved. However, if the braking force is determined to be insufficient for holding the vehicle in a stopped state, the engine remains operating so that engine creep torque and braking torque may be combined to limit vehicle motion. Further, by allowing the engine to operate, the engine may be allowed to increase vacuum for applying vehicle brakes. In this way, it may be possible to conserve additional amounts of fuel while holding the vehicle stopped until the driver intends to move the vehicle.

The present description may provide several advantages. Specifically, the approach may reduce engine fuel consumption by allowing an engine to remain in an off state for a longer period of time. Further, the approach may improve vehicle drivability. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
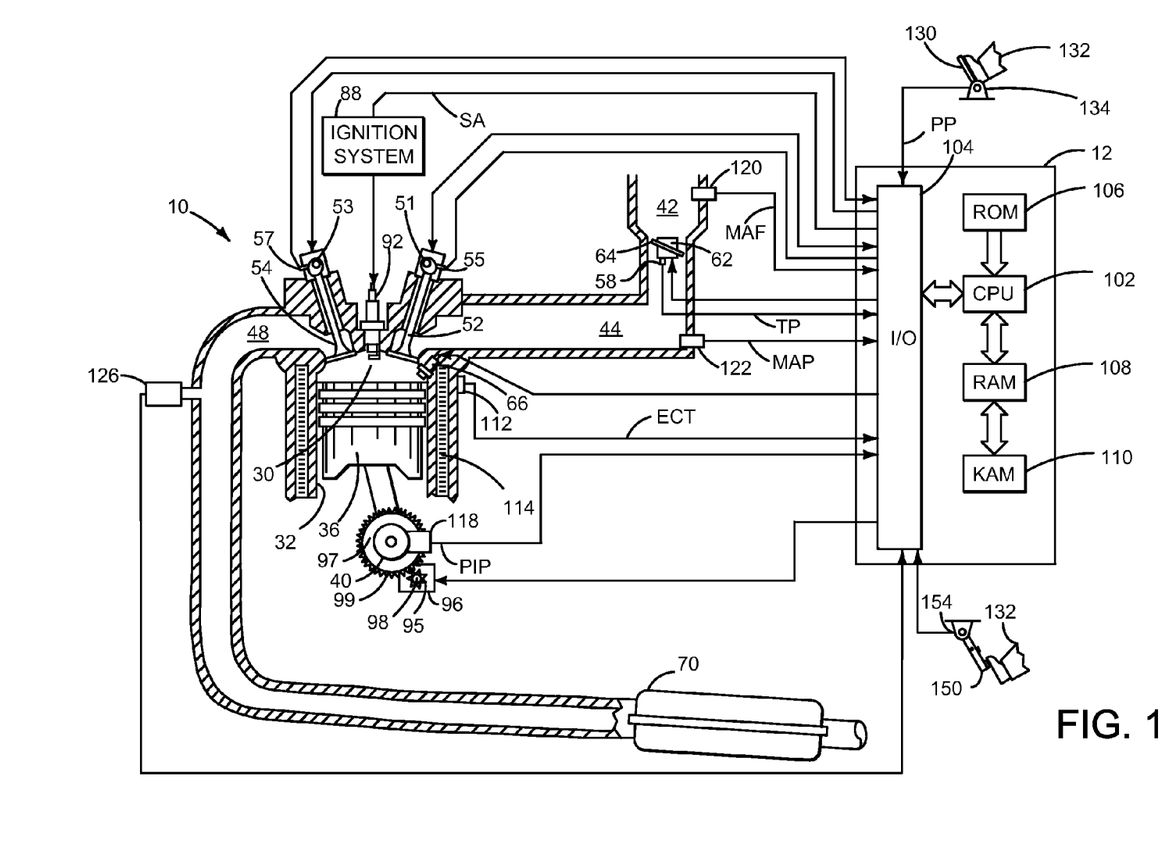
FIG. 1 is a schematic diagram of an engine.
Figure 2:
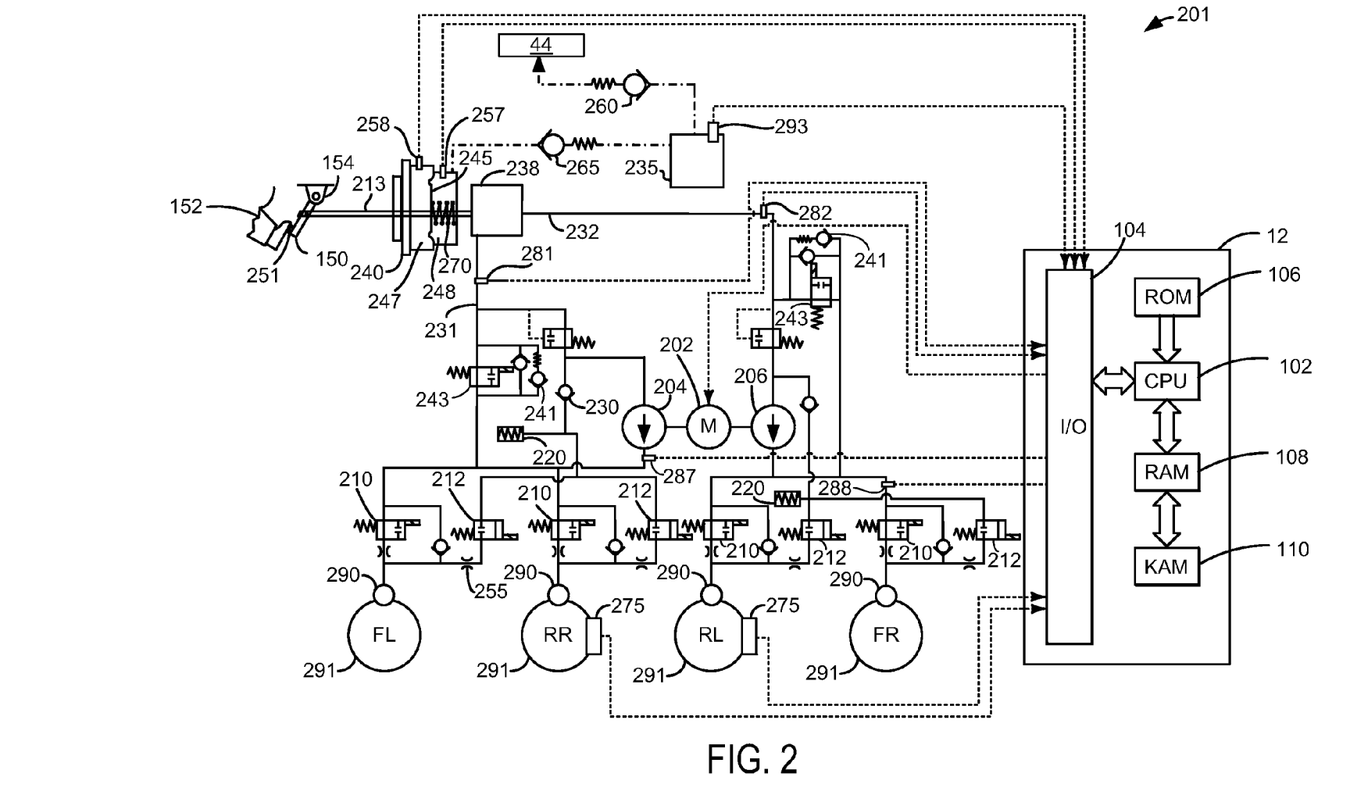
FIG. 2 is shows an example vehicle brake system.
Figure 3:
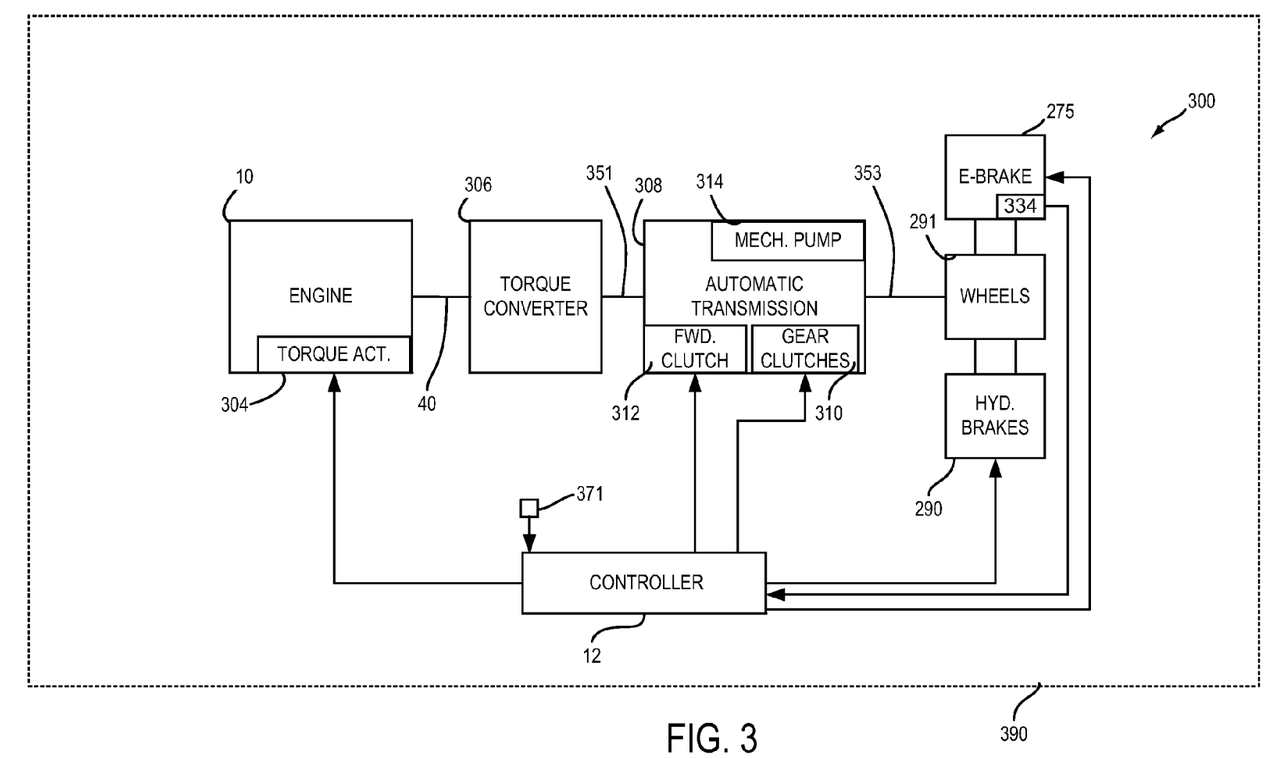
FIG. 3 shows an example vehicle driveline.

The present description is related to controlling engine operation of a vehicle. The vehicle may include an engine as a sole source of torque for propelling the vehicle. Alternatively, the vehicle may include an engine and a motor that both supply torque to propel the vehicle. FIG. 1 shows an example engine system. The vehicle may include a braking system as shown in FIG. 2 to slow the vehicle or hold the vehicle in a stopped state. The brakes may interface with a vehicle driveline as shown in FIG. 3. The driveline and braking systems may be selectively operated according to the method of FIGS. 4 and 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 4:
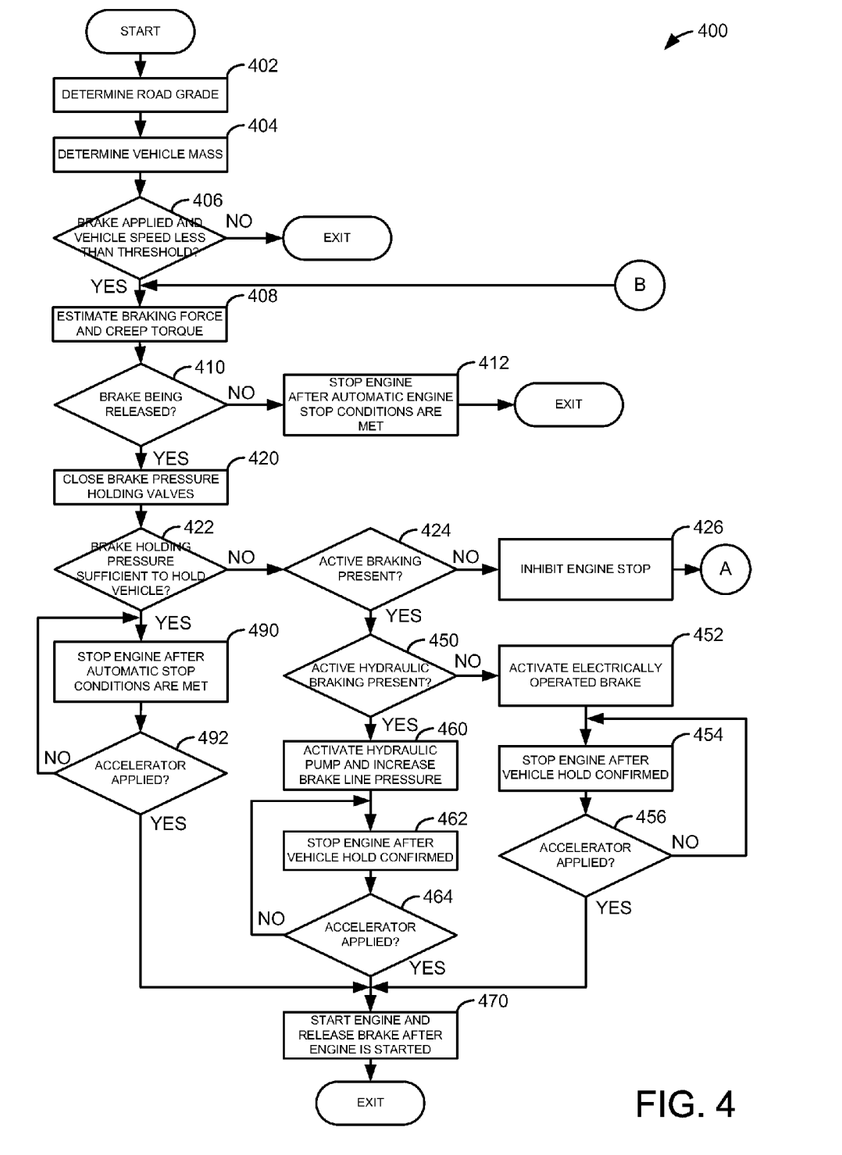
FIGS. 4 and 5 show an example flowchart of a method for operating an engine.
Figure 5:
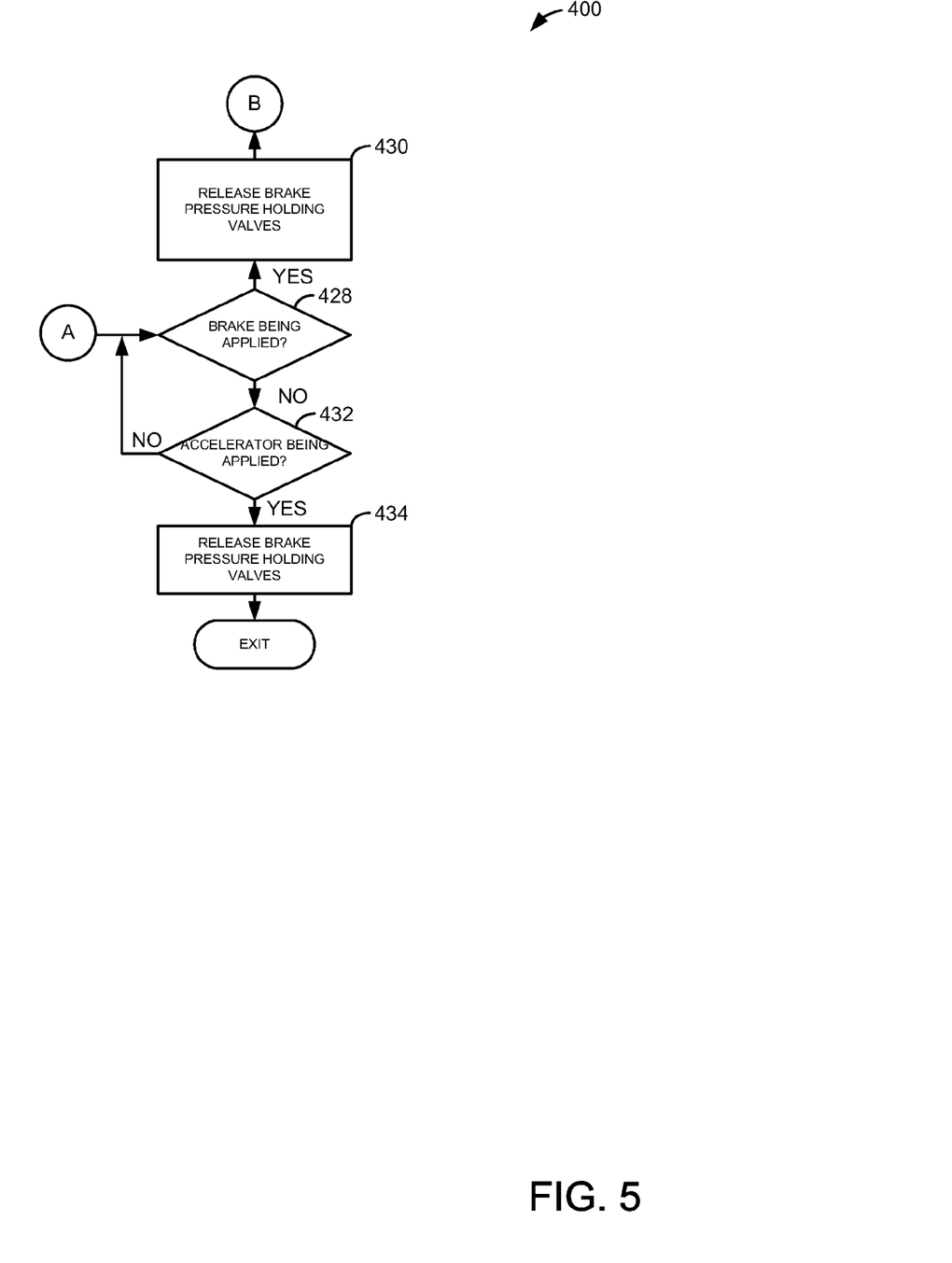

Referring now to FIG. 2, a first example braking system where the method of FIGS. 4 and 5 may be applied is shown. The braking system 201 of FIG. 2 may be included with the engine shown in FIG. 1 as systems of a vehicle. Hydraulic lines are shown solid, electrical connections are shown as dashed, and pneumatic connections are shown as dash-dot.

Braking system 201 includes a brake pedal 150 and a brake position sensor 154 as shown in FIG. 1. In some examples, brake system 201 may also include a brake pedal force sensor 251. Brake pedal 150 may be operated by foot 152 to move rod 213. Foot 152 may be assisted by brake booster 240 to urge rod 213 to pressurize fluid in master cylinder 238 such that pressure in first brake line 231 and second brake line 232 increases when brake pedal 150 is depressed. Brake booster 240 includes a diaphragm 245 which is coupled to rod 213 and upon which vacuum applies force to pressurize oil in master cylinder 238. Brake booster 240 includes a working chamber 247, a vacuum chamber 248, and a return spring 270. In this example, working chamber 247 selectively receives air from a high pressure source being atmospheric pressure. When brake pedal 150 is depressed, pressure increases in working chamber 247 as vacuum is displaced with ambient air. Pressure sensor 258 senses pressure in working chamber 247. Pressure sensor 257 senses pressure in vacuum chamber 248.

Vacuum reservoir 235 supplies vacuum to brake booster 240 via check valve 265. Pressure in vacuum reservoir 235 is sensed via pressure sensor 293. In some examples, vacuum reservoir 235 may be incorporated into brake booster 240. Vacuum is supplied to vacuum reservoir 235 via check valve 260. Vacuum is supplied to check valve 260 via the engine intake manifold 44 or a device such as an ejector.

The numerous hydraulic valves shown in FIG. 2 provide the many purposes of the brake system. When the valves are in their default positions, the system works as if there is no electronic control. When the valves and motors are actuated, it provides the ability to apply and release hydraulic pressure to the wheel brakes or groups of wheel brakes to accomplish many purposes including holding the vehicle in a stopped state, anti-lock braking, and traction control. Master cylinder 238 may supply pressurized oil to brakes 290 for stopping rotation of wheels 291. Normally open valves 210 and normally closed valves 212 control the flow of pressurized fluid from master cylinder 238 and/or hydraulic pumps 204 and 206. In particular, normally open valves 210 and normally closed valves 212 may isolate output from hydraulic brake pumps 204 and 206 to master cylinder 238 when hydraulic pumps 204 and 206 are operating.

Hydraulic pumps 204 and 206 are operated by motor 202, and motor 202 is controlled by controller 12. The output pressure of pumps 204 and 206 may be monitored via optional pressure sensors 287 and 288. Orifices 255 limit pressure changes in the system and accumulators 220 allow pressure in brakes to be relieved when normally closed valves upstream of the accumulators are closed. Check valves 230 limit the flow between master cylinder 238 and hydraulic pumps 204 and 206. The output pressure of master cylinder 238 may be monitored via pressure sensors 281 and 282. Check valves 241 prevent fluid from flowing from hydraulic pumps 204 and 206 to master cylinder 238. Normally closed flow control valves 243 may be opened when it is desirable to hold hydraulic pressure at brakes 290 or when pumps 204 and 206 are activated to increase hydraulic pressure to brakes 290. Vehicle wheels 291 are individually designated, the front left vehicle wheel is designated FL, the front right wheel is designated FR, the right rear wheel is designated RR, and the rear left wheel is designated RL.

Electrically actuated brakes 275 are shown for rear left and right brakes. However, electrically actuated brakes 275 may be positioned at all wheels.

Referring now to FIG. 3, an example vehicle driveline 300 is shown. Vehicle driveline 300 includes engine 10 as shown in greater detail in FIG. 1. Engine 10 may include one or more torque actuators 304. Torque actuator 304 may be an engine throttle, variable camshaft, fuel injector, ignition system, or other device that may affect engine torque. Engine torque may be increased or decreased via operating the torque actuator.

Engine 10 provides torque to torque converter 306 via crankshaft 40. Torque converter 306 hydraulically couples engine 10 to transmission input shaft 351. Automatic transmission 308 includes a forward clutch 312 and gear clutches 310. Mechanical pump 314 supplies pressurized transmission fluid to torque converter 306, gear clutches 310, and forward clutch 312.

Driveshaft 353 directs torque from transmission 308 to vehicle wheels 291. Force may be supplied to vehicle wheels via hydraulic brakes 290, or optionally, electrically operated brakes 335. Electrically operated brakes 275 may be operated as parking brakes or holding brakes when vehicle 390 is desired to be held in a stopped state. Hydraulic brakes 290 may be applied while vehicle 390 is moving, is desired to be held in a stopped state, and as holding or parking brakes. Additionally, hydraulic brakes 290 and electric brake 275 may be applied when inclinometer 371 indicates a road grade greater than a threshold road grade when vehicle 390 is stopped.

Thus, the system of FIGS. 1-3 provides for a vehicle system, comprising: a vehicle including an engine, a brake pedal, brake holding valves, and vehicle brakes; and a controller including non-transitory instructions executable to partially close the brake holding valves in response to a driver at least partially releasing a brake pedal. The vehicle system includes additional instructions to stop rotation of the engine in response to confirmation the vehicle brakes are applied after the driver at least partially releases the brake pedal. The vehicle system further comprises a hydraulic brake pump and additional instructions to activate the hydraulic brake pump in response to vehicle motion. The vehicle system further comprises a hydraulic brake pump and additional instructions to activate the hydraulic brake pump in response to road grade, vehicle mass, and creep torque. The vehicle system further comprises an electrically actuated brake and additional instructions to activate the electrically actuated brake in response to brake line pressure before the engine is allowed to stop rotating. The vehicle system further comprises instructions to release the brake holding valves in response to application of an accelerator pedal, and where the brake holding valves restrict or allow flow of brake fluid to the vehicle brakes.

Referring now to FIGS. 4 and 5, a method for operating an engine is shown. The method of FIGS. 4 and 5 may be stored as executable instructions in controller 12 for the system of FIGS. 1-3. Further, the method of FIGS. 4 and 5 may provide the example sequence shown in FIG. 6.

At 402, method 400 determines road grade. In one example, road grade may be estimated based on output of inclinometer 371. Inclinometer 371 outputs a value, current, or voltage that is representative of road grade. Road grade may be alternatively output as an angle referenced to a horizontal plane. Alternatively, road grade may be estimated via the equation described at 403 when vehicle mass is known. Method 400 proceeds to 404 after road grade is determined.

At 404, method 400 estimates vehicle mass. In one example, vehicle mass is estimated based on the following: Engine/driveline torque is approximately equal to road load+ grade based torque.

$$Twh_1 = Rrr \cdot Mv \cdot g \cdot \sin(\theta_1) + Trl_1$$

Where $Twh_1$ is wheel torque on grade $\theta_1$, Rrr is the driven wheel rolling radius, Mv is vehicle mass, g is gravity constant, $\theta_1$ is the first road grade angle, and $Trl_1$ is the road load torque at the driven wheel on grade $\theta_1$. Thus, the vehicle mass estimate is as follows:

$$Mv = \frac{(Twh_1 - Twh_2) + (Trl_2 - Trl_1)}{Rrr \cdot g \cdot (\sin\theta_1 - \sin\theta_2)}$$

Where $Twh_2$ is wheel torque on grade $\theta_2$, $\theta_2$ is the second road grade angle, and $Trl_2$ is the road load torque at the driven wheel on grade $\theta_2$. Method 400 estimates vehicle mass and proceeds to 406.

At 406, method 400 judges whether or not the vehicle brake pedal is applied and vehicle speed is less than a threshold vehicle speed. Method 400 may judge that the vehicle brake pedal is applied based on a position of a brake pedal. Method 400 judges whether or not vehicle speed is less than a threshold vehicle speed based on output of a vehicle speed sensor. If method 400 judges that the vehicle brake pedal is applied and vehicle speed is less than a threshold speed, the answer is yes and method 400 proceeds to 408. Otherwise, the answer is no and method 400 proceeds to exit.

At 408, method 400 estimates the braking force applied to the vehicle wheel. In one example, the braking force at each wheel may be estimated by the hydraulic force the wheel brake pistons apply to the brake pads $$\left( e.g., \frac{\pi}{4} \cdot d^2 \cdot P, \right.$$

where d is the brake piston diameter, P is pressure in the brake cylinder, and $\pi$ is a constant). The braking force may be converted to a torque via the radius from the rolling radius to the brake caliper. Method 400 proceeds to 410 after the braking force is estimated.

Additionally, the vehicle creep torque may be determined at 408 based on engine torque, torque converter torque multiplication, driveline gear ratios, and the wheel radius. The engine torque may be estimated based on engine speed, engine air amount, and engine spark timing. In one example, engine speed, air amount, and spark timing index a table or a function that outputs and empirically determined engine torque. The engine torque is adjusted based on a torque converter transfer function, the transmission gear ratio, the wheel rolling radius and transmission losses to estimate the vehicle creep torque.

At 410, method 400 judges whether or not the vehicle's hydraulically actuated brakes are being released via the driver at least partially releasing a brake pedal. Method 400 may judge that vehicle brakes are being released based on a position of a brake pedal. If method 400 judges that brakes are being released, the answer is yes and method 400 proceeds to 420. Otherwise, the answer is no and method 400 proceeds to 412.

At 412, method 400 stops the engine if automatic engine stop conditions are met while the brake is being applied. In one example, method 400 stops the engine via stopping fuel flow to the engine after vehicle speed is zero, the engine is at idle speed, the brake is applied, and a predetermined amount of time has expired since engine stop conditions were met. Method 400 proceeds to exit after the engine is automatically stopped (e.g., the engine is stopped without the driver requesting an engine stop via an input that has a sole function of stopping and starting the engine, such as an ignition switch).

At 420, method 400 closes brake pressure holding valves in response to the driver releasing vehicle brakes. For example, valves 243 of FIG. 2 may be closed to hold hydraulic pressure at vehicle brakes 290 while the driver is not applying the vehicle brake pedal 150. By fully closing the brake pressure holding valves in response to the driver releasing the brake pedal, the vehicle may remain in a stopped state while vehicle brakes are not applied by the driver. Further, the engine remains operating at 420.

In some examples, the opening amount of the brake pressure holding valve may be decreased instead of being fully closed. The brake pressure holding valve average opening amount may be reduced via modulating the brake pressure holding valve by way of an electrically modulated control signal. Alternatively, an orifice that limits flow into and out of vehicle brakes 290 may be switched into the hydraulic braking circuit to reduce, but not stop flow of brake fluid out of or into vehicle brakes 290. By partially closing the brake pressure holding valves, the driver may continue to increase braking force if the driver quickly reapplies the brake. Further, the rate that pressure is reduced at the vehicle brakes is reduced so that the hydraulically applied brakes may hold the vehicle stopped for a longer period of time. In this way, it may be possible to reduce the possibility of a driver experiencing hard brake pedal feel. Method 400 proceeds to 422 after brake pressure holding valves are adjusted.

At 422, method 400 judges whether or not there is sufficient force being applied to the vehicle brakes to hold the vehicle in place. In one example, method 400 compares the force applied by the brakes to the wheels determined at 408 including the position of the wheel brake with respect to the wheel hub to the force applied to move the vehicle. The force applied to move the vehicle is the sum of creep torque (e.g., engine torque multiplied by the torque converter multiplication, multiplied by the driveline gear ratios, and subtracting driveline torque loss) and $m \cdot g \cdot r \cdot \sin(\theta)$, where m is vehicle mass, g is the gravity constant, r is the tire rolling radius, and $\theta$ is the angle of the road. If the force applied to the vehicle brakes is greater than the force applied to move the vehicle, the answer is yes and method 400 proceeds to 490. Otherwise, the answer is no and method 400 proceeds to 424.

In some other examples, method 400 judges whether or not the vehicle is moving at 422. If so, method 400 proceeds to 424. Otherwise, method 400 proceeds to 490. By evaluating whether or not the vehicle is moving, it may be determined whether or not the applied braking force is sufficient for the present vehicle operating conditions to keep the vehicle in a stopped state.

In still other examples, method 400 assumes predetermined amounts for vehicle mass, road grade, and creep torque to evaluate whether or not applied braking force is sufficient to hold the vehicle at a stop. The predetermined values of vehicle mass, road grade, and creep torque are a basis for determining a predetermined braking force, and the predetermined braking force is applied without assessing actual vehicle mass, road grade, or creep torque. Therefore, method 400 simply determines whether or not braking force is greater than a predetermined brake force threshold. If so, method 400 proceeds to 490. Otherwise, method 400 proceeds to 424. In these ways, method 500 may provide alternative ways to determine if the engine is allowed to stop rotating after automatic stop start conditions are met, or if alternative actions may be taken.

At 490, method 400 allows the engine to automatically stop rotating if selected start stop conditions are met. For example, the engine may be stopped rotating if engine temperature is greater than a threshold temperature and catalyst temperature is greater than a threshold temperature and if the engine is at idle speed and if the battery state of charge is greater than a threshold state of charge. Other, different, or fewer vehicle operating conditions may also be considered before the engine is stopped rotating. If the selected automatic stopping conditions are not met, the engine may be allowed to continue running. If the selected automatic start stop conditions are met, the engine is stopped rotating. Method 400 proceeds to 492 after the engine is allowed to stop rotating.

At 492, method 400 judges whether or not the accelerator pedal is being applied or if the driver demand torque (e.g., torque requested by a driver) is greater than a threshold torque. The driver demand torque and application of the accelerator pedal may be determined from the position of the accelerator pedal. If method 400 judges that the accelerator pedal is being applied or that the driver demand torque is greater than a threshold torque, the answer is yes and method 400 proceeds to 470. Otherwise, the answer is no and method 400 returns to 490.

At 470, method 400 restarts the engine if the engine has stopped rotating. The engine may be restarted by engaging a starter, rotating the engine, and supplying fuel and spark to the engine. Additionally, the vehicle brakes, whether hydraulically or electrically actuated, are released after the engine is started. If the engine is already started, the vehicle brakes are released. Method 400 exits after the engine is started and the brakes are released.

At 424, method 400 judges whether or not active braking is present. In this example, active braking is braking that may be applied automatically without operator input to increase braking force and to provide a holding function (e.g., holding a vehicle from moving while a brake pedal is released). Active braking may be applied while the drive is applying the brakes or if the driver is not applying the brakes. Active braking may be performed via hydraulic, mechanical, vacuum, or electrical activation. In one example, a location in controller memory may be set to a value that represents whether or not active braking is present. If method 400 judges that active braking is present, the answer is yes and method 400 proceeds to 450. Otherwise, the answer is no and method 400 proceeds to 426.

At 426, method 400 inhibits or stops automatic engine stopping (e.g., stopping the engine without driver input to a device that has a sole purpose of stopping and/or starting the engine). Method 400 proceeds to 428 at FIG. 5 after automatic engine stopping is inhibited.

At 428, method 400 judges whether or not vehicle brakes are being applied. In one example, method 400 judges whether or not vehicle brakes are being applied based on brake pedal position. If method 400 judges that vehicle brakes are being applied the answer is yes and method 400 proceeds to 430. Otherwise, the answer is no and method 400 proceeds to 432.

At 430, method 400 releases or opens the brake pressure holding valves (e.g., valve 243 of FIG. 2 is released from an open state to a closed state allowing the driver to apply or release the brakes). Brake pressure holding valves are released from a closed state while the engine is running and while the brakes are applied so that the driver does not experience hard brake pedal feel and so that the driver may increase pressure applied to the vehicle brakes. Method 400 returns to 408 after brake pressure holding valves are released.

At 432, method 400 judges whether or not the accelerator pedal or driver demand torque is increasing. Accelerator pedal position and driver demand torque may be determined from a position of the accelerator pedal. If the accelerator pedal is being applied, the answer is yes and method 400 proceeds to 434. Otherwise, the answer is no and method 400 returns to 428.

At 434, method 400 releases or opens the brake pressure holding valves. Brake pressure holding valves are released when the accelerator is applied so that torque is provided to vehicle wheels according to the driver's intention. Method 400 proceeds to exit after brake pressure holding valves are released.

At 450, method 400 judges whether or not active hydraulic braking is present. In one example, method 400 may identify whether or not hydraulic braking is present based on a value of a variable stored in controller memory. If method 400 judges that active hydraulic braking is present, the answer is yes and method 400 proceeds to 460. Otherwise, the answer is no and method 400 proceeds to 452.

At 452, method 400 activates electrically operated wheel brakes. The electrically operated wheel brakes may be activated by supplying current to the wheel brakes. Applying the electrically operated wheel brakes applies a predetermined force to the wheel brakes. Method 400 proceeds to 454 after the electrically operated wheel brake is activated.

At 454, method 400 allows automatic engine stopping after it is confirmed that the vehicle is being held. In one example, the vehicle is confirmed being held when the electrically operated wheel brakes are fully applied and when vehicle speed is zero. The engine may be stopped via stopping fuel flow to the engine. The electrically operated wheel brakes may be confirmed to be fully applied via a limit switch or other actuator position sensing device. If the vehicle is not confirmed being in a held state, the engine continues to rotate. The engine may be stopped from rotating when automatic stopping conditions are present (e.g., vehicle speed zero, engine temperature greater than a threshold, etc.). Method 400 proceeds to 456.

At 456, method 400 judges whether or not the accelerator pedal is being applied or if the driver demand torque (e.g., torque requested by a driver) is greater than a threshold torque. The driver demand torque and application of the accelerator pedal may be determined from the position of the accelerator pedal. If method 400 judges that the accelerator pedal is being applied or that the driver demand torque is greater than a threshold torque, the answer is yes and method 400 proceeds to 470. Otherwise, the answer is no and method 400 returns to 454.

At 460, method 400 activates a brake hydraulic pump that supplies pressurized brake fluid to vehicle brakes without the driver applying the vehicle brake pedal. For example, motor 202 may be supplied electrical power to activate pumps 204 and 206 shown in FIG. 2. Brake pressure may increase to a predetermined pressure sufficient to hold the vehicle on a predetermined incline (e.g., 15 degrees) and a predetermined safety factor (e.g., a multiplier to increase brake force to a brake force greater than is necessary to hold the unloaded vehicle on the 15 degree incline). Additionally, states of brake valves may be changed to support increasing braking force while the driver is not applying the vehicle brake. Method 400 proceeds to 462 after the hydraulic brake pump is activated.

At 462, method 400 allows automatic engine stopping after it is confirmed that the vehicle is being held. The vehicle may be confirmed being held when the hydraulic brake pressure exceeds a predetermined brake pressure and when vehicle speed is zero. The hydraulic brake pressure may be confirmed via output of a pressure sensor (e.g., 287 of FIG. 2). If the vehicle is not confirmed being in a held state, the engine continues to rotate. The engine may be stopped from rotating when automatic stopping conditions are present (e.g., vehicle speed zero, engine temperature greater than a threshold, etc.). Method 400 proceeds to 464.

At 464, method 400 judges whether or not the accelerator pedal is being applied or if the driver demand torque (e.g., torque requested by a driver) is greater than a threshold torque. The driver demand torque and application of the accelerator pedal may be determined from the position of the accelerator pedal. If method 400 judges that the accelerator pedal is being applied or that the driver demand torque is greater than a threshold torque, the answer is yes and method 400 proceeds to 470. Otherwise, the answer is no and method 400 returns to 462.

In this way, the method of FIGS. 4 and 5 allows a vehicle to be held in place and judges whether or not holding conditions are desirable for stopping engine rotation. The vehicle hold operation may be released or disengaged in response to application of an accelerator pedal or in response to an increase in driver demand torque.

Thus, the method of FIGS. 4 and 5 provides for operating an engine, comprising: combusting an air-fuel mixture in an engine; stopping vehicle motion in response to a driver applying a brake pedal; resuming application of vehicle brakes without applying the brake pedal in response to the driver at least partially releasing the brake pedal, the vehicle brakes may be automatically applied when vehicle speed is less than a threshold speed; and stopping engine rotation in response to an indication applied braking force is sufficient to hold the vehicle from moving. The method includes where the vehicle brakes are hydraulically actuated. The method includes where the vehicle brakes are electrically actuated, and where the electrically actuated brakes are engaged in response to hydraulically actuated brakes are being released via the driver releasing the brake pedal. The method includes where engine rotation is stopped via stopping fuel flow to the engine, and where a pressure sensor provides an indication of whether or not applied braking force is sufficient to hold the vehicle from moving. The method includes where an electric brake is confirmed to be in an applied state before stopping engine rotation. The method further comprises restarting the engine in response to application of an accelerator pedal. The method further comprises releasing applied vehicle brakes in response to application of the accelerator pedal.

In another example, the method of FIGS. 4 and 5 provides for A method for operating an engine, comprising: combusting an air-fuel mixture in an engine; stopping vehicle motion in response to a driver applying a brake pedal; applying vehicle brakes in response to the driver at least partially releasing the brake pedal, vehicle mass, road grade, and creep torque; and stopping engine rotation in response to an indication applied braking force is sufficient to hold the vehicle from moving.

In some examples, the method includes where vehicle mass, road grade, and creep torque are based on predetermined values, and where vehicle brakes are applied with a predetermined force based on the predetermined values. The method further comprises increasing applied braking force if vehicle motion is determined. The method includes where applied braking force is increased via a hydraulic pump. The method further comprising applying an electric brake in response to vehicle motion. The method includes where vehicle brakes are applied via changing state of brake pressure holding valves to maintain brake pressure applied by the driver. The method includes where the brake pressure holding valves are partially closed.

Figure 6:
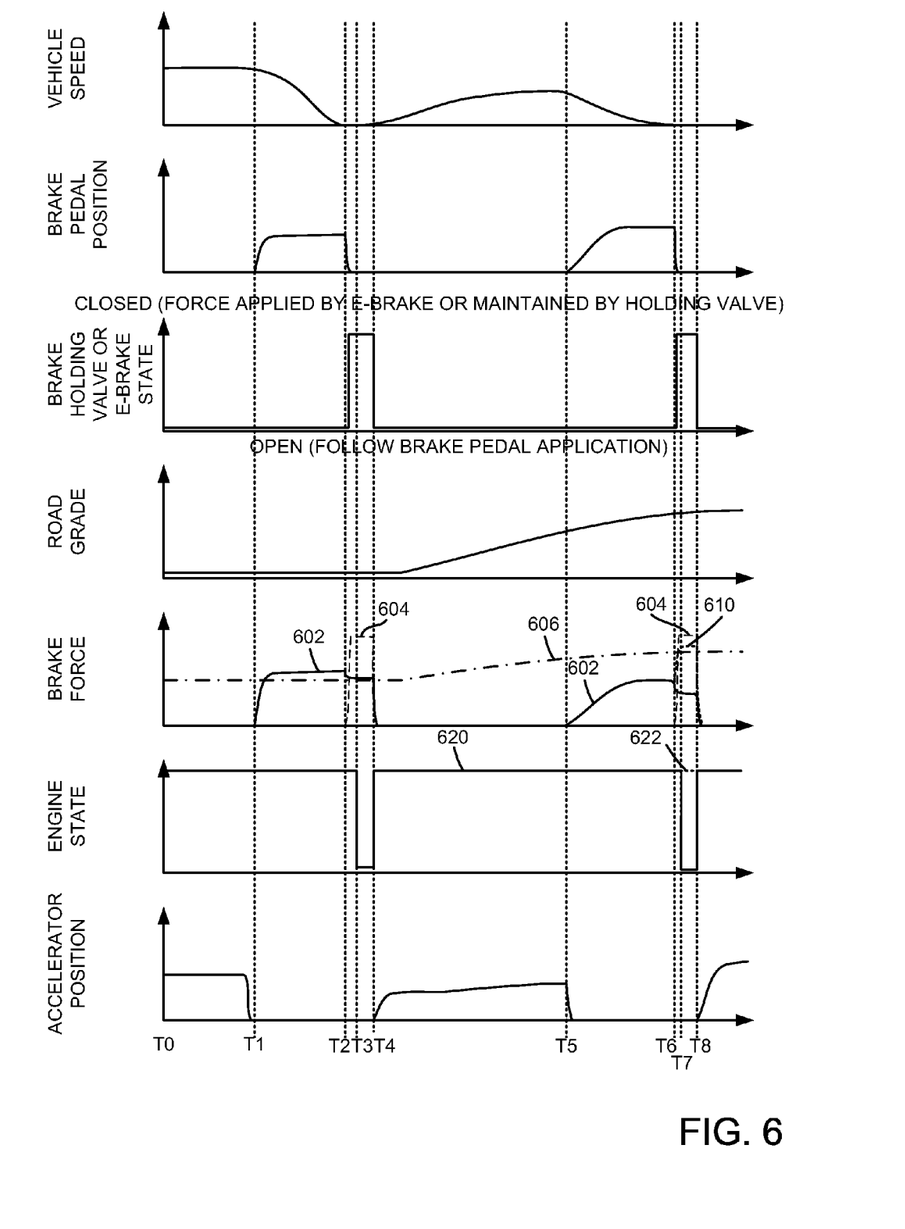
FIG. 6 shows an example prophetic engine operating sequence according to the method of FIGS. 4 and 5.

Referring now to FIG. 6, an example prophetic engine operating sequence according to the method of FIGS. 4 and 5 is shown. Vertical markers T0-T8 represent times of interest during the sequence.

The first plot from the top of FIG. 6 is a plot of vehicle speed versus time. The X axis represents time and time increases from the left side of FIG. 6 to the right side of FIG. 6. The Y axis represents vehicle speed and vehicle speed increases in the direction of the Y axis.

The second plot from the top of FIG. 6 is a plot of brake pedal position versus time. The X axis represents time and time increases from the left side of FIG. 6 to the right side of FIG. 6. The Y axis represents brake pedal position and the brake pedal is applied further (e.g., commanding more force) in the direction of the Y axis.

The third plot from the top of FIG. 6 is a plot of brake holding valve state, or alternatively electric brake (E-brake) state versus time. The X axis represents time and time increases from the left side of FIG. 6 to the right side of FIG. 6. The Y axis represents brake holding valve state, or alternatively E-brake state. The brake holding valve is closed, where brake pressure and force applied to hydraulic brakes is maintained at its present level, when the brake holding valve state is at a higher level. If an E-brake is present, the E-brake is applied when the brake signal is at a higher level. The holding valve is open allowing brake line pressure to follow brake pedal position when the brake holding valve state is at a lower level (e.g., open). If an E-brake is present, the E-brake is not applied when the brake signal is at a lower level.

The fourth plot from the top of FIG. 6 is a plot of road grade versus time. The X axis represents time and time increases from the left side of FIG. 6 to the right side of FIG. 6. The Y axis represents road grade and road grade increases in the direction of the Y axis. As road grade increases, additional braking force may be needed to hold the vehicle in a stopped state.

The fifth plot from the top of FIG. 6 is a plot of brake holding force versus time. The X axis represents time and time increases from the left side of FIG. 6 to the right side of FIG. 6. The Y axis represents brake holding force versus time and brake holding force increases in the direction of the Y axis. Dash dot line 606 represents an amount of brake holding force for maintaining the vehicle in a stopped state. The brake holding force 606 is determined from creep torque, vehicle mass, and road grade. If brake holding force is less than the brake holding force 606, the vehicle may move. Solid line 602 represents brake holding force that is provided via the hydraulic braking system. Short dashed line 610 represents brake holding force when active braking via a hydraulic pump is provided. Wide dashed line 604 represents braking force of an applied E-brake.

The sixth plot from the top of FIG. 6 is a plot of engine state versus time. The X axis represents time and time increases from the left side of FIG. 6 to the right side of FIG. 6. The Y axis represents engine state and the engine is combusting an air-fuel mixture when the engine state is at a higher level. The engine is stopped when the engine state is at a lower level. Engine state trace 620 represents engine state for a system that includes active braking or an E-brake. Engine state trace 622 (dashed line) represents engine state for a system that does not include active braking Engine state trace 620 and 622 are equivalent when only engine state trace 620 is shown.

The seventh plot from the top of FIG. 6 is a plot of accelerator position versus time. The X axis represents time and time increases from the left side of FIG. 6 to the right side of FIG. 6. The Y axis represents accelerator position and the accelerator is applied further in the direction of the Y axis.

At time T0, the vehicle speed is at a middle level and the brake pedal position indicates that the brake is not applied. The brake holding valve is not holding brake line pressure, and for systems that hold the vehicle in a stopped state via an E-brake, the E-brake is not applied. The road grade is zero indicating that the road is flat. The brake force is zero since the brakes are not applied. The engine is operating and the accelerator is at a middle level; however, the accelerator pedal is released just before time T1.

At time T1, the driver applies the vehicle brake as indicated by the brake pedal position. The vehicle speed begins to decrease in response to application of vehicle brakes and the brake holding valve is in an open state allowing braking force to follow brake pedal application. For systems including an E-brake, the E-brake is not applied. The road grade remains at zero and the braking force begins to increase. The braking force increases as brake fluid pressure supplied to the vehicle brakes increases. The engine remains operating and the accelerator is not applied.

At time T2, the driver releases the brake pedal after the vehicle has stopped. A small reduction in braking force occurs as the driver releases the vehicle brakes and before the brake holding valve is closed to stop brake fluid from exiting the brakes. In systems that include an E-brake, the E-brake is applied. The road grade remains at zero and the brake force remains above the amount of brake holding force for maintaining the vehicle in a stopped state 606. The engine remains operating and the accelerator remains in a not applied state.

At time T3, confirmation is provided that the braking force is greater than the amount of brake holding force for maintaining the vehicle in a stopped state. The confirmation may be provided by comparing a brake line pressure to a threshold pressure. The engine is stopped rotating in response to receiving confirmation that brake force is greater than an amount of brake force for maintaining the vehicle in a stopped state. Vehicle speed remains at zero and the brake is not applied. The brake holding valve remains closed. The E-brake remains applied for systems that include an E-brake. The engine remains stopped and the accelerator pedal remains not activated.

At time T4, the driver applies the accelerator pedal to indicate and intent to move the vehicle. The engine is restarted in response to the accelerator pedal being applied and the brakes are released which allows the brake force to be reduced. The road grade remains at zero and the brake pedal is not applied.

Between time T4 and time T5, vehicle speed increases and the brakes are not applied as indicated by the brake pedal being at zero. The engine continues to operate and the road grade begins to increase. Force necessary to hold the vehicle in a stopped state 606 increases as the road grade increases.

At time T5, the driver applies the vehicle brakes and the vehicle begins to decelerate in response to vehicle brakes being applied. Additionally, the accelerator pedal position is reduced by the driver. The engine continues to operate and the braking force begins to increase in response to the driver applying the brake pedal. The brake holding valve remains open and the E-brake is not applied for systems that include an E-brake.

At time T6, the vehicle has stopped while the engine is operating and the driver releases the brake pedal without applying the accelerator pedal. The brake holding valve is closed in response to the driver releasing the brake pedal. However, the brake force is less than brake force for maintaining the vehicle in a stopped state.

At time T7, different outcome for different systems are shown. For systems that include the E-brake, the E-brake is applied and the braking force 604 increases to a braking force that is greater than the brake force for maintaining the vehicle in a stopped state 606. Therefore, for a vehicle that includes an E-brake, the engine state 620 transitions to a low level to indicate a stopped engine.

Similarly, for systems that include the active hydraulic brakes, the hydraulic brake pump is activated and the braking force 610 increases to a braking force that is greater than the brake force for maintaining the vehicle in a stopped state 606. Therefore, for a vehicle that includes active hydraulic brakes, the engine state 620 transitions to a low level to indicate a stopped engine.

For vehicles that do not include active hydraulic brakes or E-brakes, the brake force remains less than the brake force for maintaining the vehicle in a stopped state 606. Consequently, the engine remains activated as indicated by trace 622. The difference in brake force and the brake force for maintaining the vehicle in a stopped state result from increased road grad.

At time T8, the driver applies the accelerator pedal to indicate intent to move the vehicle. The brakes are released in response to application of the accelerator pedal and the engine is restarted for systems where brake force was sufficient to hold the vehicle in a stopped state. The brake holding valve is opened so that braking force is reduced.

In this way, the method of FIGS. 4 and 5 may reduce the possibility of vehicle motion while allowing the engine to remain stopped even when a driver releases a brake pedal. Consequently, the engine may remain stopped longer so that fuel conservation may be increased.

As will be appreciated by one of ordinary skill in the art, method described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
combusting an air-fuel mixture in an engine;
stopping vehicle motion in response to a driver applying a brake pedal;
applying vehicle brakes without applying the brake pedal in response to the driver at least partially releasing the brake pedal; and
determining a sum of engine creep torque and gravitation torque based vehicle mass and road grade;
stopping engine rotation of the combusting engine in response to an indication that applied braking force is greater than the sum torque; wherein the vehicle brakes are hydraulically actuated, and wherein if the applied barking force is not greater than the sum torque, activating a hydraulic pump and then stopping the engine after increasing the applied braking force.

2. The method of claim 1, where the vehicle brakes are electrically actuated, and where the electrically actuated brakes are engaged in response to hydraulically actuated brakes being released via the driver releasing the brake pedal, wherein the engine creep torque is determined based on engine torque multiplied by torque converter multiplication, multiplied by driveline gear ratios, and subtracting driveline torque loss.

3. The method of claim 1, where engine rotation is stopped via stopping fuel flow to the engine, and where at least a pressure sensor provides an indication of whether or not applied braking force is greater than the sum torque.

4. The method of claim 1, where an electric brake is confirmed to be in an applied state before stopping engine rotation.

5. The method of claim 1, further comprising restarting the engine in response to application of an accelerator pedal.

6. The method of claim 5, further comprising releasing applied vehicle brakes in response to application of the accelerator pedal.

7. A method for operating an engine, comprising:
combusting an air-fuel mixture in an engine;
stopping vehicle motion in response to a driver applying a brake pedal;
applying vehicle brakes in response to the driver at least partially releasing the brake pedal and a determined force based on vehicle mass, road grade, and engine creep torque; and
stopping engine rotation in response to an indication that applied braking force is sufficient to hold the vehicle from moving; where the determined force is a determined force to move the vehicle including a sum of creep torque, gravitation force based vehicle mass and road grade, and where vehicle brakes are applied with a predetermined force based on the sum.

8. The method of claim 7, further comprising increasing applied braking force if vehicle motion is determined.

9. The method of claim 8, where applied braking force is increased via a hydraulic pump.

10. The method of claim 7, further comprising applying an electric brake in response to vehicle motion.

11. The method of claim 7, where vehicle brakes are applied via changing state of brake pressure holding valves to maintain brake pressure applied by the driver.

12. The method of claim 11, where the brake pressure holding valves are partially closed.

13. A vehicle system, comprising:
a vehicle including an engine, a brake pedal, brake holding valves, and vehicle brakes; and a controller including non-transitory instructions executable to partially close the brake holding valves in response to a driver at least partially releasing a brake pedal; and additional instructions to activate the brake holding valves in response to a determined torque based on a sum of an engine and torque converter creep torque and a gravitational torque based on road grade and vehicle mass; including additional instructions to stop rotation of the engine in response to confirmation the vehicle brakes are applied after the driver at least partially releases the brake pedal and that braking torque is greater than the sum.

14. The vehicle system of claim 13, further comprising a hydraulic brake pump and additional instructions to activate the hydraulic brake pump in response to vehicle motion.

15. The vehicle system of claim 13, further comprising a hydraulic brake pump and additional instructions to activate the hydraulic brake pump in response to the determined sum.

16. The vehicle system of claim 13, further comprising an electrically actuated brake and additional instructions to activate the electrically actuated brake in response to brake line pressure before the engine is allowed to stop rotating.

17. The vehicle system of claim 13, further comprising instructions to release the brake holding valves in response to application of an accelerator pedal, and where the brake holding valves restrict or allow flow of brake fluid to the vehicle brakes.

* * * * *

UNITED STATES PATENT AND TRADEMARK OFFICE
CERTIFICATE OF CORRECTION

PATENT NO. : 9,327,710 B2
APPLICATION NO. : 14/025725
DATED : May 3, 2016
INVENTOR(S) : Mark Douglas Malone et al.

It is certified that error appears in the above-identified patent and that said Letters Patent is hereby corrected as shown below:

In the claims, column 14, line 15, replace "barking" with "braking".

Signed and Sealed this
Nineteenth Day of July, 2016

Michelle K. Lee
*Director of the United States Patent and Trademark Office*